(12) United States Patent
Kapahnke et al.

(10) Patent No.: US 7,730,454 B1
(45) Date of Patent: Jun. 1, 2010

(54) LOTUS NOTES TO CLEARQUEST BRIDGE

(75) Inventors: Bernd Kapahnke, Boeblingen (DE);
Peter Mailand, Holzgerlingen (DE);
Arthur Winterling, Boeblingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/421,495

(22) Filed: Apr. 9, 2009

(51) Int. Cl.
*G06F 9/45* (2006.01)
(52) U.S. Cl. .................................................. 717/124
(58) Field of Classification Search .............. 717/149, 717/124
See application file for complete search history.

(56) References Cited

U.S. PATENT DOCUMENTS

| | | | |
|---|---|---|---|
| 6,259,890 B1* | 7/2001 | Driscoll et al. | 434/350 |
| 2002/0049962 A1 | 4/2002 | Kelbaugh et al. | |
| 2004/0107125 A1* | 6/2004 | Guheen et al. | 705/7 |
| 2004/0117759 A1 | 6/2004 | Rippert, Jr. et al. | |
| 2008/0244325 A1 | 10/2008 | Tyulenev | |

OTHER PUBLICATIONS

"DevSuite—Complete Integration, Complete Traceability, and Complete Visibility", 1 page, retrieved Apr. 7, 2009 <http://www.foxdata.com/devsuite/integrated_development_tool.htm>.

* cited by examiner

*Primary Examiner*—John Chavis
(74) *Attorney, Agent, or Firm*—Yee & Associates, P.C.; William Kinnaman, Jr.

(57) ABSTRACT

A computer implemented method migrates test management data between a Lotus Notes® test management application and a tracking application. A user interface of the Lotus Notes® test management application receives a user action. The user action is an action to be taken on a document of the tracking application. The user action is a view of the document, a modification of the document, or a creation of the document. The document is a test document or a problem document. A bridge application is then triggered to communicate the user action from the Lotus Notes® test management application to the tracking application. The bridge application retrieves mapping information for the document. The bridge application then utilizes the mapping information to perform the user action on the document of the tracking application. The bridge agent then receives the document of the tracking application. The bridge agent maps the document of the tracking application to the user interface of the Lotus Notes® test management application using the mapping information. The user interface of the Lotus Notes® test management application then presents the document of the tracking application to the user.

1 Claim, 5 Drawing Sheets

LOTUS NOTES TO CLEARQUEST BRIDGE

BACKGROUND OF THE INVENTION

1. Field of the Invention

The present invention relates generally to computer implemented methods. More specifically, the present invention relates to computer implemented methods for migrating test management data between a Lotus Notes® test management application and a tracking application.

2. Description of the Related Art

Today many test management tools exist which contain a repository for test cases and problems. These test management tools provide a tracking mechanism. A broad range of these tools is based on Lotus Notes® or Rational® test management tools.

Lotus Notes® test management tools provide strength and flexibility in the area of test case management. Additionally, Lotus Notes® test management tools provide rich text field support.

In the case of Rational ClearQuest® test management tools, solutions are provided that excel in problem management and life cycle management. However, Rational ClearQuest® test management tools are insufficient in the case of rich text field support. Rational ClearQuest® test management tools fail to provide rich text field support integrated for ClearQuest®.

Currently, there is no interoperability between both Lotus Notes® test management tools and Rational ClearQuest® test management tools for migration and collaboration. Thus, any migration from Lotus Notes® to Rational® test management tools currently requires a lot of manual effort from the operator.

BRIEF SUMMARY OF THE INVENTION

According to one embodiment of the present invention, a computer implemented method is provided for migrating test management data between a Lotus Notes® test management application and a tracking application. A user interface of the Lotus Notes® test management application receives a user action. The user action is an action to be taken on a document of the tracking application. The user action is a view of the document, a modification of the document, or a creation of the document. The document is a test document or a problem document. A bridge application is then triggered to communicate the user action from the Lotus Notes® test management application to the tracking application. The bridge application retrieves mapping information for the document. The bridge application then utilizes the mapping information to perform the user action on the document of the tracking application. The bridge agent then receives the document of the tracking application. The bridge agent maps the document of the tracking application to the user interface of the Lotus Notes® test management application using the mapping information. The user interface of the Lotus Notes® test management application then presents the document of the tracking application to the user.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
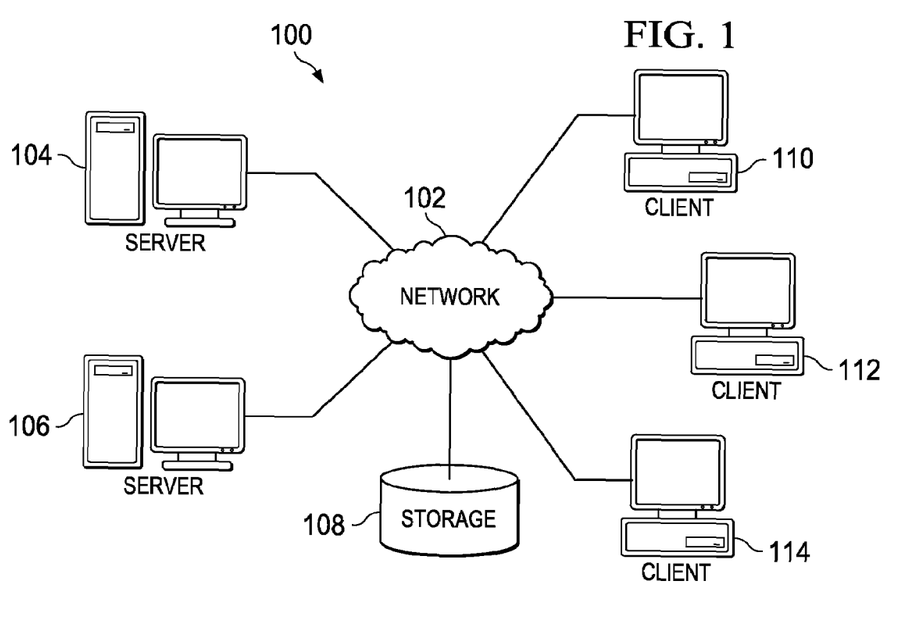
FIG. 1 is a pictorial representation of a network of data processing systems in which illustrative embodiments may be implemented.
Figure 2:
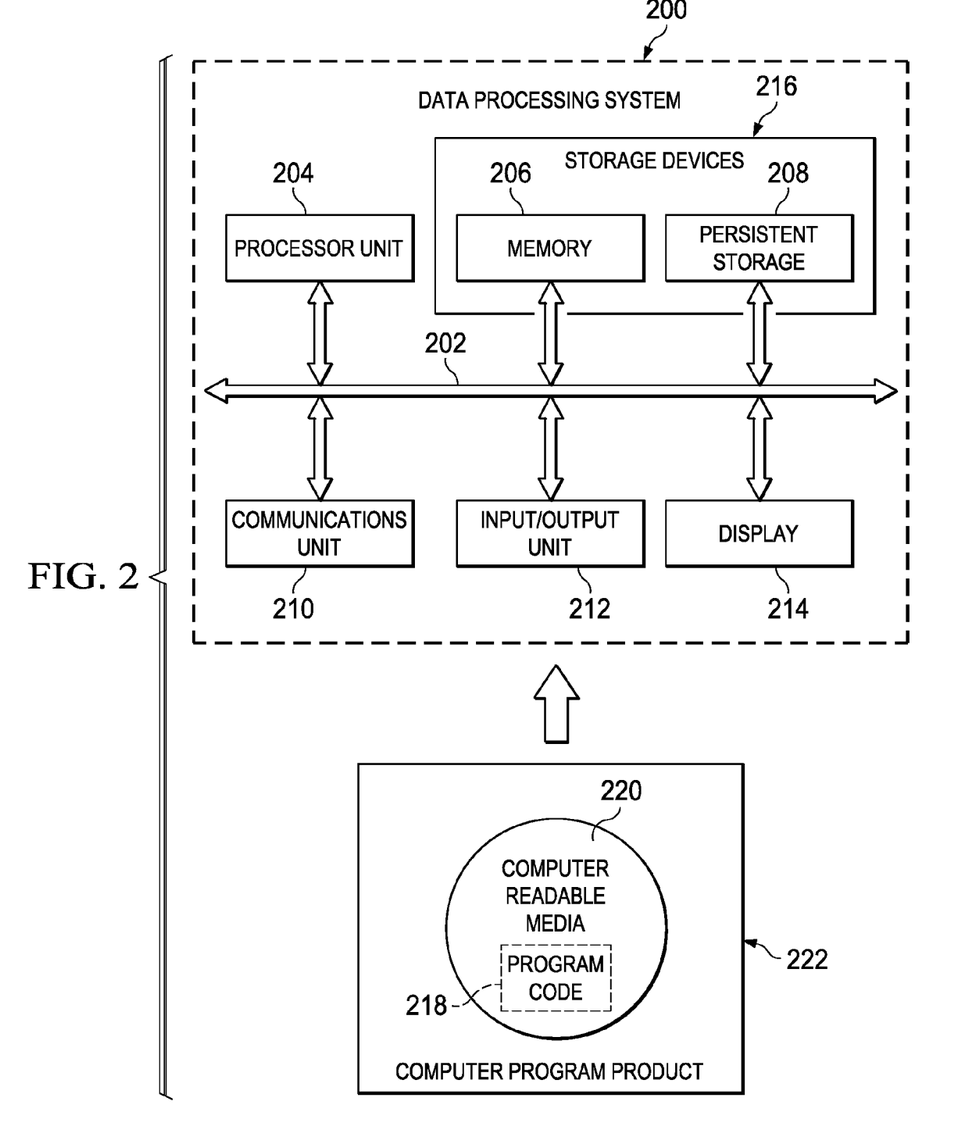
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or on a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications According to one embodiment of the present invention, a computer implemented method is provided for migrating test management data between a Lotus Notes® test management application and a tracking application. A user interface of the Lotus Notes® test management application receives a user action. The user action is an action to be taken on a document of the tracking application. The user action is a view of the document, a modification of the document, or a creation of the document, wherein the document is a test document or a problem document. A bridge application is then triggered to communicate the user action from the Lotus Notes® test management application to the tracking application. The bridge application retrieves mapping information for the document. The bridge application then utilizes the mapping information to perform the user action on the document of the tracking application. The bridge agent then receives the document of the tracking application. The bridge agent maps the document of the tracking application to the user interface of the Lotus Notes® test management application using the mapping information. The user interface of the Lotus Notes® test management application then presents the document of the tracking application to the user.

Figure 3:
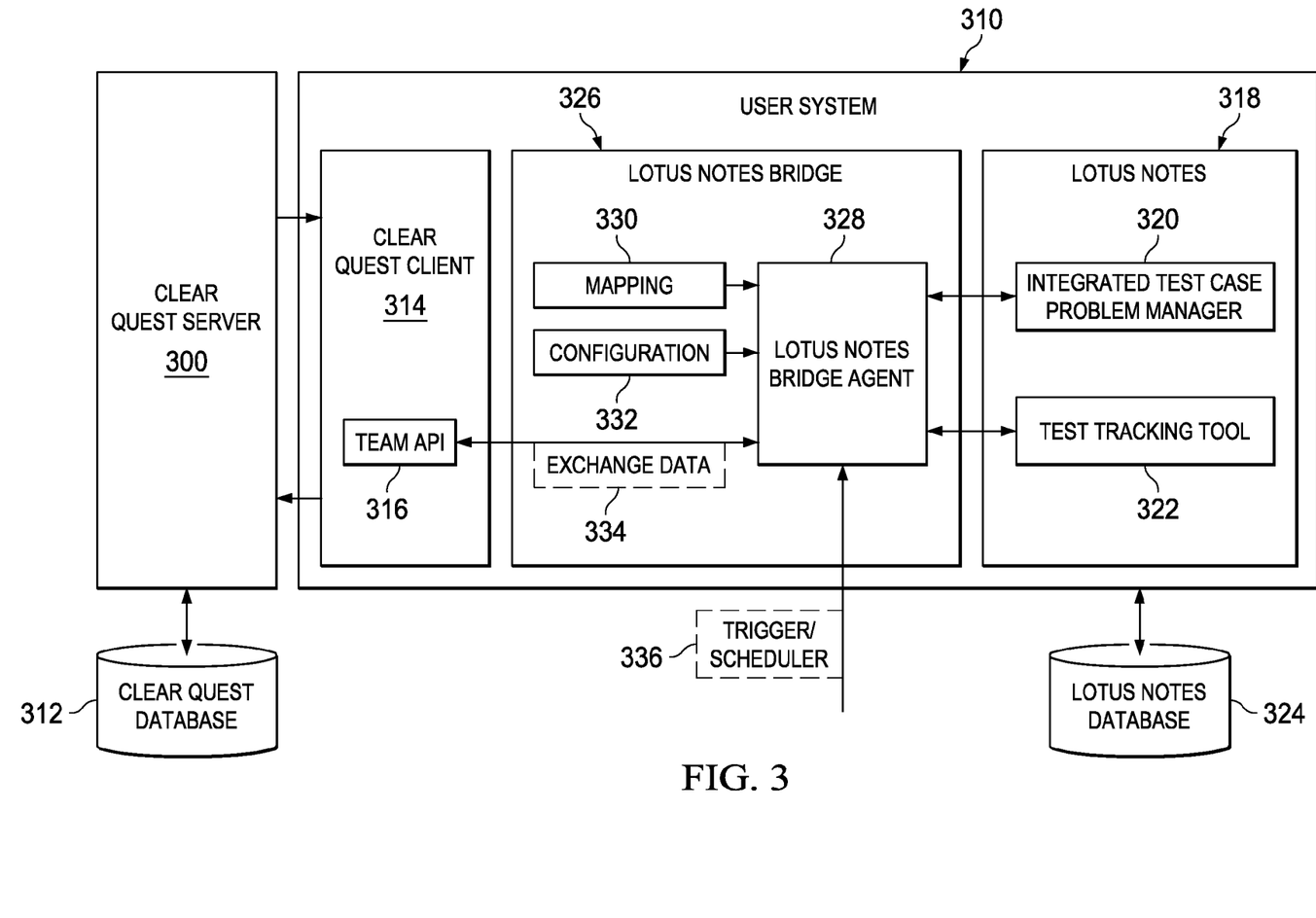
FIG. 3 is a dataflow diagram for and collaborating between Lotus Notes® test management applications and ClearQuest® databases according to an illustrative embodiment.

Referring now to FIG. 3, a dataflow diagram for and collaborating between Lotus Notes® test management applications and ClearQuest® databases is shown according to an illustrative embodiment. ClearQuest® Sever 300 is a data processing system, such as one of server 104 and server 106 of FIG. 1. User system 310 is a data processing system, such as one of clients 110, 112, and 114 of FIG. 1.

ClearQuest® server 300 is a server on which a ClearQuest® software suite is installed. ClearQuest® is a workflow automation software and bug tracking system available from International Business Machines, Corp. ClearQuest® is also available in a web version, which alleviates the heavy requirements of the full client version.

ClearQuest® database 312 is a storage unit, such as storage unit 108 of FIG. 1. Among other objects, ClearQuest® database 312 stores test record documents and problem record documents for use with the ClearQuest® software suite.

ClearQuest® client 314 is a client side software system by which a user can perform actions on the ClearQuest® server 300. Among other actions, a user can utilize ClearQuest® client 314 to create a new ClearQuest® problem document, to modify an existing ClearQuest® problem document, to view an existing problem document, to create a new test case document, to modify an existing test case document, and to view an existing test case document.

ClearQuest® client 314 includes Team API 316. Team API is an application program interface that can be utilized to input instructions into ClearQuest® client 314.

Lotus Notes® 318 is a client-server, collaborative software suite available from International Business Machines, Corp. Lotus Notes® 318 provides an integrated desktop for accessing business e-mail, calendars and applications.

Lotus Notes® 318 includes Integrated Test Case Problem Manager 320 and Test Tracking Tool 322. Integrated Test Case Problem Manager 320 is a Lotus Notes based application. It provides a test case workflow and problem workflow in one single application. The test case workflow covers test case management and execution tracking. The problem workflow covers problem management and problem tracking. Additionally, these two workflows can interact with each other. Test Tracking Tool 322 is an application which can support either a test case and problem tracking workflow or both. On Lotus Notes® there exists several Lotus Notes® test management applications (e.g. TTT, ITPM). The Lotus Notes® test management application is a workflow application, which contains test case documents and problem documents. The user interacts with the Lotus Notes® test management application and can create, update or query test cases and problems.

Lotus Notes® database 324 is a storage unit, such as storage unit 108 of FIG. 1. Among other objects, Lotus Notes® database 324 stores test record documents and problem record documents for use with the Lotus Notes® software suite.

Lotus Notes® bridge 326 is a software component that provides a bidirectional connection between Lotus Notes® test management applications and ClearQuest® Databases. The advantage of the Lotus Notes® bridge is that the user can continue to work in a well known Lotus Notes® environment and does not need to interact directly with ClearQuest®. The Lotus Notes® test management application interacts with the Lotus Notes® bridge, which does all the ClearQuest® relevant communication and tasks.

Lotus Notes® bridge 326 includes Lotus Notes® bridge agent 328. Lotus Notes® bridge agent 328 is the main component of Lotus Notes® bridge 326. The Lotus Notes® test management application triggers Lotus Notes® bridge agent 328 to do the different tasks. The Lotus Notes® test management application triggers Lotus Notes® bridge agent 328 to perform such tasks as, but not limited to, create, query, and modify ClearQuest® test case and problem records. The Lotus Notes® test management application triggers Lotus Notes® bridge agent 328 to perform such tasks as, but not limited to, access to the ClearQuest® database and Lotus Notes® test management application. The Lotus Notes® test management application triggers Lotus Notes® bridge agent 328 to perform such tasks as, but not limited to, query and modify Lotus Notes® test management application test case and problem documents. Lotus Notes® bridge 326 interacts with the Lotus Notes® test management application to read and update test case and problem documents.

Configuration document 332 is read by Lotus Notes® bridge 326 for several tasks. Configuration document 332 contains the authentication and ClearQuest® databases information, which is used to access ClearQuest® client 314 via Team API 316.

Mapping document 330 is read by Lotus Notes® bridge 326 and is used to map the Lotus Notes® fields of a test case or problem document with the fields of a ClearQuest® test case or problem record. Mapping document 330 is used to modify and query ClearQuest® records and Lotus Notes® documents.

Trigger/Scheduler 336 is an indication from a user action at the Lotus Notes® test management application that triggers Lotus Notes® bridge 326 when a problem case or test case is created, modified or status is requested. Lotus Notes® bridge agent 328 can be scheduled on a regular time base to trigger Lotus Notes® bridge 326 to request the status.

Figure 4:
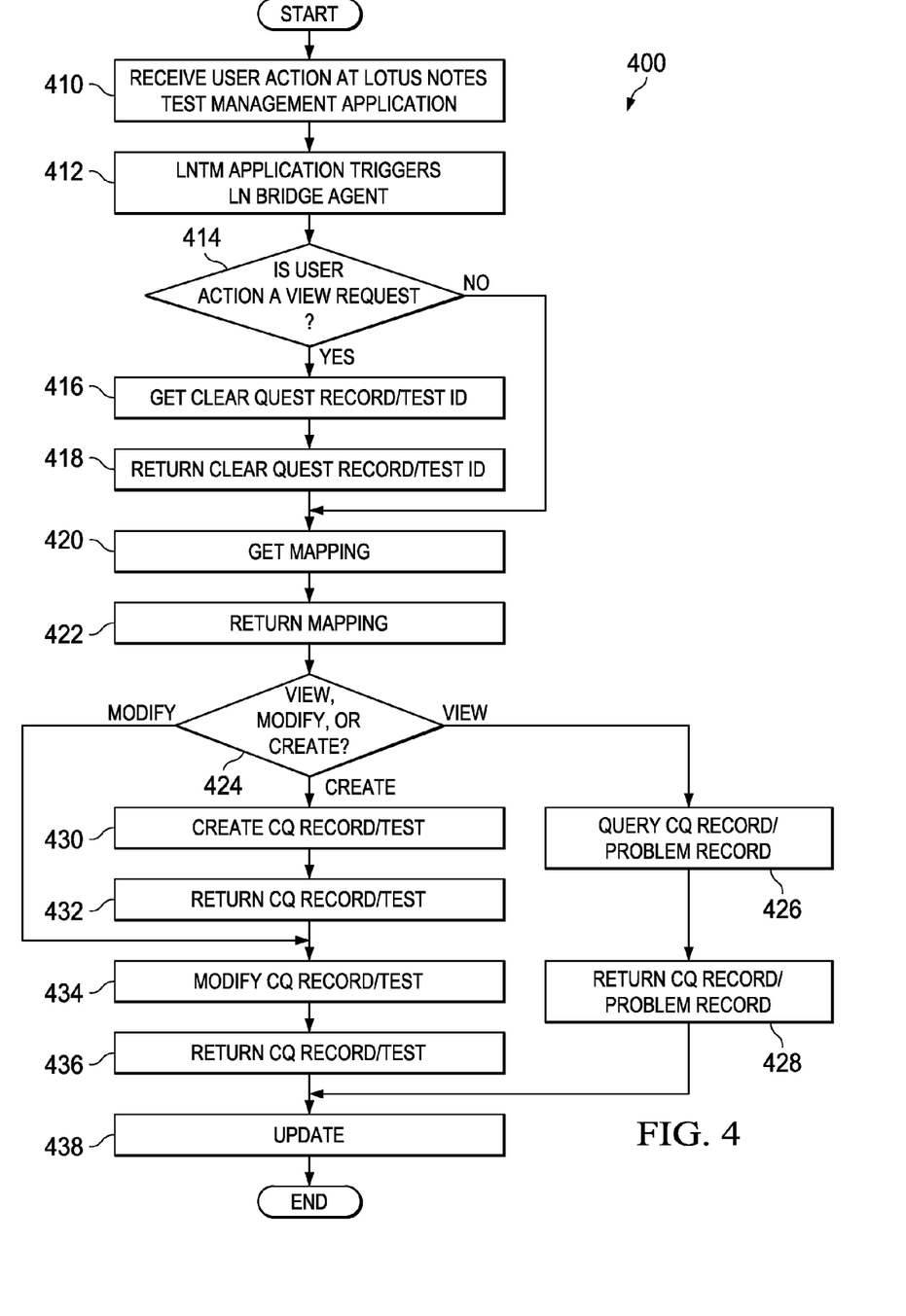
FIG. 4 is a flowchart for migrating and collaborating between Lotus Notes® test management applications and ClearQuest® databases according to an illustrative embodiment.

Referring now to FIG. 4, a flowchart for migrating and collaborating between Lotus Notes® test management applications and ClearQuest® databases is shown according to an illustrative embodiment. Process 400 is a software process, executing on a software component, such as Lotus Notes® bridge 326 of FIG. 3.

Process 400 begins when the Lotus Notes® test management application receives a user action (step 410). The Lotus Notes® test management application can be, for example, but not limited to, integrated test case & problem manager 320 of FIG. 3 or test tracking tool 322 of FIG. 3. The user action can be, for example, a creation of a new problem document, a modification of an existing problem document, a view request of an existing problem document, a creation of a new test case document, a modification of an existing test case document, a view request of an existing test case document.

Responsive to the Lotus Notes® test management application receiving the user action, the Lotus Notes® bridge agent receives a trigger from the Lotus Notes® test management application (step 412). The trigger is a notification from the Lotus Notes® test management application that the Lotus Notes® bridge agent should handle the user action received by the Lotus Notes® test management application.

Responsive to receiving the trigger, process 400 determines whether the user action is a view request (step 414). The view request can be a view request of an existing problem document or a view request of an existing test case document. Responsive to process 400 determining that the user action is a view request ("yes" at step 414), process 400 requests the ClearQuest® Record or Test Identification from the ClearQuest® Team API (step 416). The ClearQuest® Team API then identifies the requested ClearQuest® Record or Test Identification from the ClearQuest® Database, and returns the ClearQuest® Record or Test Identification to the Lotus Notes® bridge agent. There, process 400 receives the requested ClearQuest® Record or Test Identification from the ClearQuest® Database (step 418). Process 400 then proceeds to step 420 to retrieve mapping.

Returning now to step 414, responsive to process 400 determining that the user action is not a view request ("no" at step 414), process 400 requests mapping information (step 420). The mapping information maps the Lotus Notes® test management application problem document fields with the ClearQuest® record fields. Mapping definitions are used by the Lotus Notes® bridge, to map the Lotus Notes® document fields with the ClearQuest® record fields from problems and test cases. The mapping definition is stored in a Lotus Notes® document. The main advantage of the mapping document is that it can be easily customized to support different Lotus Notes® test management application and ClearQuest® test case and problem databases. Therefore, the Lotus Notes® bridge can support different documents and records field structures. Process 400 then receives the mapping information from the ClearQuest® Team API (step 422).

Process 400 then identifies whether the user action is a view request, a modification request, or a creation request (step 424). If the user action is a view request ("view" at step 424), process 400 requests the ClearQuest® test record/problem record (step 426). Utilizing the returned mapping information, the Lotus Notes® bridge maps the Lotus Notes® instruction into the ClearQuest® Team API to request the problem record by using the ClearQuest® record ID. The Lotus Notes® bridge maps the Lotus Notes® document fields with the ClearQuest® record fields, thereby generating the request. Process 400 then receives the ClearQuest® test record/problem record back from the ClearQuest® Team API (step 428).

Returning now to step 424, if the user action is a creation request ("create" at step 424), process 400 instructs the ClearQuest® Team API to create a new test record/problem record (step 430). Utilizing the returned mapping information, the Lotus Notes® bridge maps the Lotus Notes® instruction into the ClearQuest® Team API to request the creation of a new ClearQuest® test record/problem. ClearQuest® then creates the new test record/problem, and stores the new test record/problem in the ClearQuest® database. ClearQuest® Team API then returns the new test record/problem to the Lotus Notes® bridge, where process 400 receives the new ClearQuest® test record/problem (step 432). Process 400 then proceeds to step 434.

Returning now to step 424, if the user action is a modification request ("modify" at step 424), process 400 instructs the ClearQuest® Team API to modify an existing test record/problem record (step 434). The Lotus Notes® bridge uses the ClearQuest® Team API to modify the test record/problem record by using the ClearQuest® record ID. The Lotus Notes® bridge uses the mapping information to map the Lotus Notes® test management application test record/problem record document fields with the ClearQuest® record fields. Rich text objects are not supported by ClearQuest®. Therefore, rich text objects are not passed to ClearQuest®. ClearQuest® Team API then returns the modified test record/problem to the Lotus Notes® bridge, where process 400 receives the modified ClearQuest® test record/problem (step 436).

Process 400 then updates the Lotus Notes® test management application test record/problem record (step 438), with the process terminating thereafter. In the case where the user action was a creation of a new test record/problem record, if the return code shows that the ClearQuest® Problem record was successfully created, the Lotus Notes® bridge updates the test record/problem record document in the Lotus Notes® test management application. The test record/problem record documents additionally contain the Clear Quest record ID, as an association between the Lotus Notes® test management application problem document and the ClearQuest® problem record.

In the case where the user action was a viewing of an existing new test record/problem record, the Lotus Notes® bridge uses the mapping information to map the Lotus Notes® test management application test record/problem record document fields with the ClearQuest® record fields. The Lotus Notes® bridge extracts the information, such as, but not limited to, problem status and severity, from the ClearQuest® test record/problem record and updates the Lotus Notes® test management application problem/test document.

In the case where the user action was a modification of an existing new test record/problem record, the successful update is logged in the Lotus Notes® test management application test record/problem record document.

Figure 5:
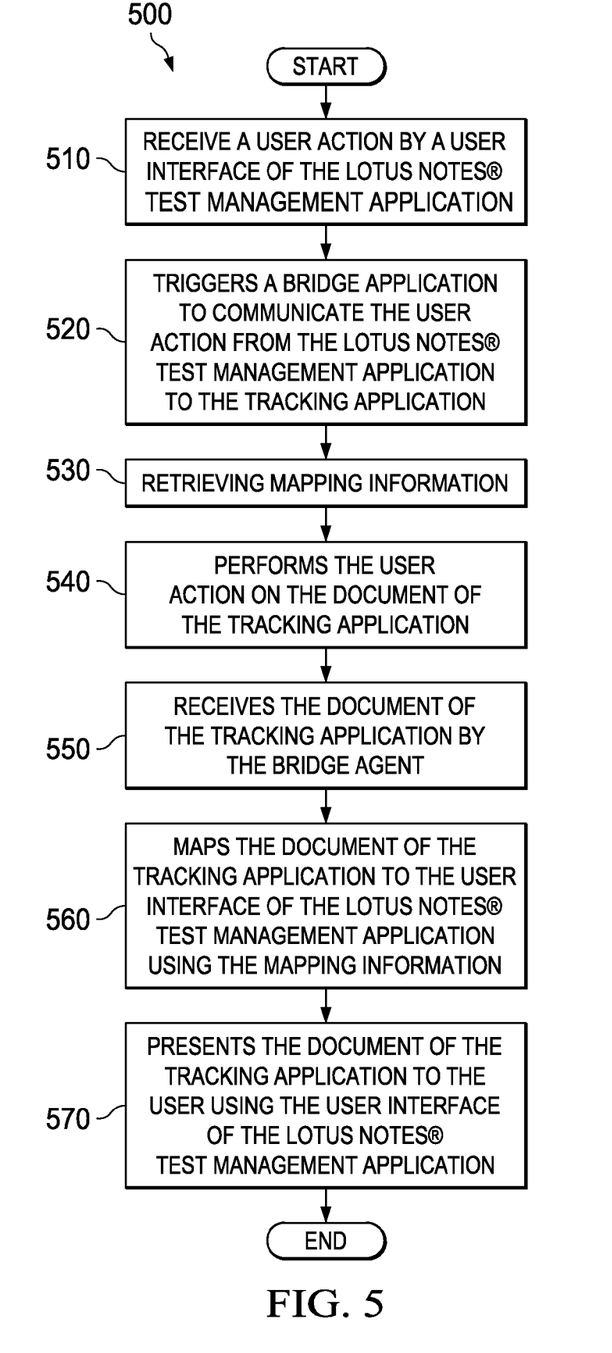
FIG. 5 is a simplified flowchart of the processing steps for migrating test management data between a Lotus Notes® test management application and a tracking application shown according to an illustrative embodiment.

Referring now to FIG. 5, a simplified flowchart of the processing steps for migrating test management data between a Lotus Notes® test management application and a tracking application is shown according to an illustrative embodiment. Process 500 is a simplified version of the process 400 presented in FIG. 4.

Process 500 begins by receiving a user action by a user interface of the Lotus Notes® test management application (step 510). The user action is an action to be taken on a document of the tracking application. The user action can be trigger/scheduler 336 of FIG. 3. In one illustrative embodiment, the user action is a view of the document, a modification of the document, or a creation of the document. In one illustrative embodiment, the document is a test document or a problem document. The Lotus Notes® test management application can be Integrated Test Case Problem Manager 320 or Test Tracking Tool 322 of FIG. 3.

Responsive to receiving the user action, process 500 triggers a bridge application to communicate the user action from the Lotus Notes® test management application to the tracking application (step 520). The bridge application can be Lotus Notes® bridge 326 of FIG. 3. The tracking application can be ClearQuest® Client 314 of FIG. 3.

Responsive to triggering the bridge application, process 500 retrieves mapping information (step 530). The mapping information is retrieved by the bridge application. The mapping information can be mapping 330 of FIG. 3.

Responsive to retrieving mapping information, process 500 performs the user action on the document of the tracking application (step 540). The user action is performed by the bridge application utilizing the mapping information. The document of the tracking application can be, for example, a ClearQuest® problem document or a ClearQuest® test document stored within ClearQuest® database 312 of FIG. 3.

Responsive to performing the user action on the document of the tracking application, process 500 receives the document of the tracking application by the bridge agent (step 550). Process 500 then maps the document of the tracking application to the user interface of the Lotus Notes® test management application using the mapping information (step 560).

Process 500 then presents the document of the tracking application to the user using the user interface of the Lotus Notes® test management application (step 570), with the process terminating thereafter. Process 500 therefore provides a bidirectional connection between Lotus Notes® test management applications and ClearQuest® Databases. The advantage of the Lotus Notes® bridge is that the user can continue to work in a well known Lotus Notes® environment and does not need to interact directly with ClearQuest®. The Lotus Notes® test management application interacts with the Lotus Notes® bridge, which does all the ClearQuest® relevant communication and tasks.

Therefore, the illustrative embodiment herein provide a computer implemented method for migrating test management data between a Lotus Notes® test management application and a tracking application. A user interface of the Lotus Notes® test management application receives a user action. The user action is an action to be taken on a document of the tracking application. The user action is a view of the document, a modification of the document, or a creation of the document. The document is a test document or a problem document. A bridge application is then triggered to communicate the user action from the Lotus Notes® test management application to the tracking application. The bridge application retrieves mapping information for the document. The bridge application then utilizes the mapping information to perform the user action on the document of the tracking application. The bridge agent then receives the document of the tracking application. The bridge agent maps the document of the tracking application to the user interface of the Lotus Notes® test management application using the mapping information. The user interface of the Lotus Notes® test management application then presents the document of the tracking application to the user.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for migrating test management data between a test management application and a tracking application, the method comprising:
   receiving a user action by a user interface of the test management application, the user action to be taken on a document of the tracking application, wherein the user action is a view of the document, a modification of the document, or a creation of the document, and wherein the document is a test document or a problem document;
   responsive to receiving the user action, triggering a bridge application to communicate the user action from the test management application to the tracking application;
   responsive to triggering the bridge application, retrieving mapping information, wherein the mapping information is retrieved by the bridge application;
   responsive to retrieving mapping information, performing the user action on the document of the tracking application, wherein the user action is performed by the bridge application utilizing the mapping information;
   responsive to performing the user action on the document of the tracking application, receiving the document of the tracking application by the bridge agent;
   responsive to receiving the document of the tracking application by the bridge agent, mapping the document of the tracking application to the user interface of the test management application using the mapping information; and
   presenting the document of the tracking application to the user using the user interface of the test management application.

* * * * *